United States Patent [19]
Behrle

[11] 3,825,284
[45] July 23, 1974

[54] SAFETY HITCH PIN
[75] Inventor: Clyde J. Behrle, Perryville, Mo.
[73] Assignee: Bill G. Bailey, Perryville, Mo. ; a part interest
[22] Filed: Oct. 11, 1973
[21] Appl. No.: 405,565

[52] U.S. Cl. ............................................. 280/515
[51] Int. Cl. ............................................ B60d 1/02
[58] Field of Search ........................... 280/515; 85/5

[56] References Cited
UNITED STATES PATENTS
| | | | |
|---|---|---|---|
| 2,593,453 | 4/1952 | Honeycutt | 280/515 X |
| 2,654,613 | 10/1953 | Blair | 280/515 |
| 3,369,628 | 2/1968 | Heinlein | 280/515 X |

Primary Examiner—Robert R. Song
Attorney, Agent, or Firm—Koenig, Senniger, Powers and Leavitt

[57] ABSTRACT

A safety hitch pin for coupling the tongue of an implement, such as a farm wagon or the like, to a towing vehicle. The safety hitch pin includes a hitch pin, a bar secured to one end of the hitch pin, a hole in the bar spaced from the hitch pin, a stud secured to one face of the tongue of the implement and spaced from the hitch pin holes in the tongue a distance corresponding to the distance the hole in the bar is spaced from the hitch pin. The stud has a transverse hole therethrough so that with the hitch pin inserted in the hitch pin holes in the implement tongue, the stud is received by the hole in the bar. A safety retaining pin insertable through the transverse hole has a pivotally movable retainer ring for locking the retaining pin relative to the stud thereby to prevent removal of the retaining pin and to positively prevent withdrawal of the hitch pin from the tongue of the implement, thus preventing inadvertent uncoupling of the implement and the towing vehicle.

4 Claims, 6 Drawing Figures

PATENTED JUL 23 1974 3,825,284
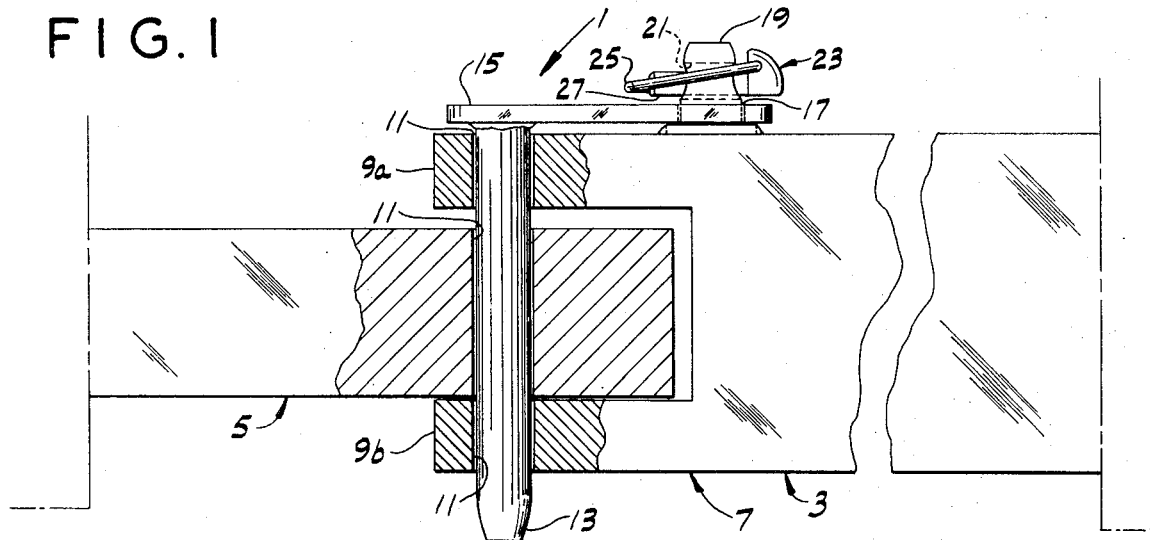
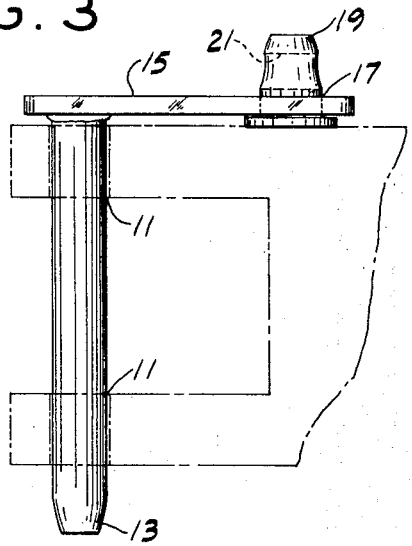
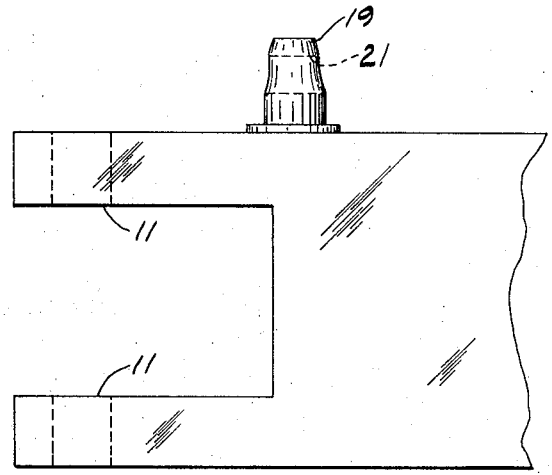
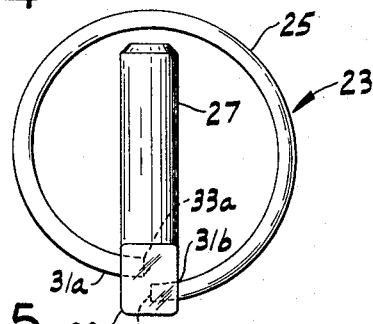
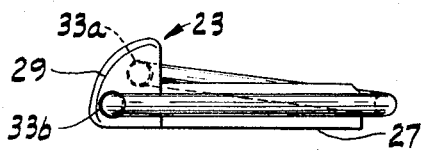
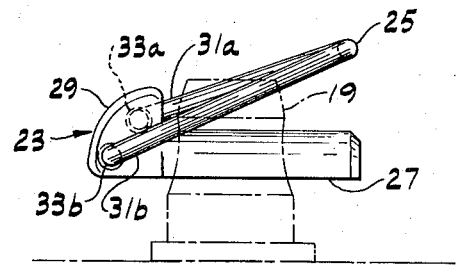

SAFETY HITCH PIN

BACKGROUND OF THE INVENTION

This invention relates to implement hitches, and is particularly concerned with retaining a hitch pin in a coupling position in the tongue of an implement (e.g., a farm wagon) for hitching the implement to a towing vehicle (e.g., a tractor or another implement) thereby to prevent the implement and the towing vehicle from accidentally becoming uncoupled.

Typically, farm implements have a tongue which is bifurcated at its free end to receive the draw bar of a tractor. The tongue and the draw bar have holes therethrough into which a hitch pin may be inserted to couple the implement tongue to the draw bar. If a hitch pin is not positively retained in its coupling position, it may work or bounce out of the hitch pin holes in the tongue and the draw bar as the implement is pulled behind the tractor, thus uncoupling the implement from the tractor and permitting it to roll out of control endangering persons and property.

Various means have been employed to retain hitch pins in a coupling position in the implement tongue, the simplest of these utilizing a cotter pin inserted in a diametric hole in the free end of the hitch pin for preventing disengagement of the hitch pin. In practice, however, cotter pins are often not used because their installation and removal requires significant time and effort and the use of tools; furthermore, cotter pins are easily lost.

Reference may be made to U.S. Pat. Nos. 2,856,804, 3,077,810, 3,383,972 and 3,658,369 which may be pertinent to the safety hitch pin of this invention.

SUMMARY OF THE INVENTION

Among the several objects of this invention may be noted the provision of a safety hitch pin confined in a coupling position in an implement tongue; the provision of such a safety hitch pin which may be readily installed on the tongue of conventional farm implements substantially without modification thereof; the provision of such a safety retainer which may be conveniently operated without the use of tools to confine the hitch pin in a coupling position or to release the hitch pin so it may readily be removed from the implement tongue; and the provision of such a safety hitch pin which is of simple and economical construction. Other objects and features will be in part apparent and in part pointed out hereinafter.

Briefly, a safety hitch pin of this invention is adapted for coupling an implement, such as a farm implement, to a towing vehicle, such as a tractor, the implement having a tongue with a bifurcated free end and the towing vehicle having a draw bar, the tongue and the draw bar having holes therethrough, whereby the draw bar received within the bifurcated tongue, the implement may be coupled to the towing vehicle by means of the hitch pin inserted through the hitch pin holes. The safety hitch pin of this invention comprises a hitch pin adapted for insertion in the hitch pin holes, a bar secured to one end of the hitch pin, a hole in the bar spaced from the hitch pin, and a stud secured to one face of the tongue and spaced from the hitch pin holes therein a distance corresponding to the distance the hole in the draw bar is spaced from the hitch pin. The stud has a transverse hole extending therethrough, and the safety hitch pin further includes a safety retaining pin insertable through the transverse hole. This retaining pin has movable means carried thereby for locking the retaining pin in the transverse hole. With the hitch pin in its hitched position, the stud is received by the hole in the bar so that the retaining pin is insertable through the transverse hole with the bar disposed between the tongue and the retaining pin, and the locking means is movable to a locked position thereby to prevent removal of the retaining pin from the stud so as to positively prevent the withdrawal of the hitch pin from its hitched position and to prevent inadvertent uncoupling of the implement and the towing vehicle.

BRIEF DESCRIPTION OF THE DRAWINGS

FIG. 1 is a side elevation illustrating a safety hitch pin retainer of this invention in a hitched position for coupling an implement tongue to a towing vehicle draw bar, with some parts shown in section;

FIG. 2 is a side elevation of the implement tongue uncoupled from the draw bar with the hitch pin removed;

FIG. 3 is an enlarged side elevation of the safety hitch pin, with the wagon tongue shown in phantom;

FIG. 4 is a plan view of a retaining pin having a movable locking bail;

FIG. 5 is a side elevation of the retaining pin shown in FIG. 4 with the locking bail illustrated in a locked position; and FIG. 6 is a side elevation view similar to FIG. 5 illustrating the locking bail in its unlocked position with portions of the safety hitch pin of this invention shown in phantom.

Corresponding reference characters indicate corresponding parts throughout the several views of the drawings.

DESCRIPTION OF THE PREFERRED EMBODIMENT

Referring to the drawings, a safety hitch pin of this invention, indicated in its entirety at 1, is shown in FIG. 1 coupling an implement (e.g., a farm wagon or other farm implement) to a towing vehicle, such as a tractor, the implement having a tongue 3 and the tractor having a draw bar 5. The tongue has a bifurcated or clevis end, as indicated at 7, formed by spaced-apart tongue members 9a, 9b. The draw bar and the tonge members have holes 11 therethrough for reception of a hitch pin for coupling the implement to the tractor. More particularly, the safety hitch pin of this invention comprises a hitch pin 13 adapted for insertion in hitch pin holes 11 in the tongue members 9a, 9b and in draw bar 5. A bar 15 is secured, as by welding, to one end of the hitch pin, this bar constituting a head for the hitch pin and extending from the hitch pin in cantilever fashion. A hole 17 is provided in the bar, this hole being spaced from the hitch pin.

As shown in FIGS. 2 and 3, a stud 19 is secured, as by welding, to the upper face of the tongue, this stud being spaced from hitch pin holes 11 in the tongue a distance corresponding to the distance between the hitch pin and hole 17 in bar 15 with the stud positioned on the tongue between hitch pin holes 11 and the implement. The stud has a transverse hole 21 therethrough, the hole being spaced above the upper surface of the tongue a distance somewhat greater than the thickness of bar 15. A retaining or linch pin, generally indicated at 23, is insertable through the transverse hole in the stud. Pin 23 pivotally carries a lock ring 25 movable relative to the pin between a locked position (see FIG. 5) in which the ring is adjacent the free end of the pin thereby to prevent removal of the pin from the transverse hole in the stud and an unlocked position (see FIG. 6) in which the ring is clear of the stud thereby to permit removal and insertion of the pin.

As best shown in FIGS. 4–6, retaining pin 23 comprises a shank 27 adapted for reception in transverse hole 21 in stud 19 and has a head 29 at one end of the shank. Ring 25 is split and has adjacent ends 31a, 31b. Head 29 has blind holes 33a, 33b in its sides, one on each side of the head for receiving a respective end 31a, 31b of ring 25. These blind holes are shown to be offset (i.e., not coaxial) relative to one another, with hole 33b below and spaced outwardly on the pin relative to hole 33a. With the ring ends pivotally received in their respective blind holes, the ring extends outwardly beyond the other or free end of the pin. More particularly, the ring is substantially coplanar with the pin when the former is in its locked position (see FIG. 5) and is angled with respect to the pin when it is in its unlocked position (see FIG. 6) so that the ring is clear of stud 19 permitting insertion and removal of the pin. Due to the ends of the ring being offset in blind holes 33a, 33b, the ring binds in the pin as it is swung relative thereto, thereby to restrain movement of the ring between its locked and unlocked positions. This binding of the ring thus prevents inadvertent movement of the locking ring from its locked to its unlocked position during towing of the implement and thus positively holds hitch pin 13 in hitch pin holes 11 and prevents inadvertent uncoupling from the tractor. The locking ring, however, may readily be moved to and from its locked position by gripping it with the fingers and pulling it or pushing it in the desired direction. Pin 23 may be attached to the wagon by means of a flexible chain or cable (not shown) to prevent loss of the pin when removed from stud 19.

To install the safety hitch pin of this invention, the implement tongue is moved into coupling relation with draw bar 5 so that hitch pin holes 11 in the tongue and in the draw bar are in alignment with one another. Hitch pin 13 is then inserted through the hitch pin holes and hole 17 in bar 15 is aligned with stud 19. When the hitch pin is in its coupled or hitched position, bar 15 is contiguous with the upper surface of the tongue and below transverse hole 21 in stud 19. Lock ring 25 is swung to its unlocked position, and the shank portion 27 of pin 23 is inserted in transverse hole 21. The lock ring is then moved to its locked position and thus the retaining pin prevents inadvertent movement of the hitch pin from its hitched position. To uncouple the implement tongue from the draw bar, lock ring 25 is moved from its locked to its unlocked position, thus enabling pin 23 to be readily removed from stud 19. The hitch pin then may readily be lifted clear of the tongue thereby to uncouple the implement.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A safety hitch pin for coupling an implement, such as a farm implement, to a towing vehicle, such as a tractor, said implement having a tongue with a bifurcated free end and said towing vehicle having a draw bar, the tongue and the draw bar having holes therein whereby with said draw bar received within said bifurcated tongues said implement may be coupled to said towing vehicle by means of a hitch pin inserted through the holes; said safety hitch pin comprising a hitch pin adapted for insertion in said hitch pin holes, a bar secured to one end of the hitch pin, a hole in the bar spaced from said hitch pin, a stud secured to one face of said tongue and spaced from said hitch pin holes therein a distance corresponding to the distance said hole in the bar is spaced from the hitch pin, said stud having a transverse hole therethrough, a safety retaining pin insertable through said transverse hole, and movable means carried by the retaining pin for locking the retaining pin relative to the stud when inserted in said transverse hole so as to retain said hitch pin in said hitch pin holes in a hitched position, whereby with said stud received by said hole in the bar and said retaining pin inserted through said transverse hole and with the bar disposed between the tongue and the retaining pin, said locking means being movable to a locked position thereby to prevent removal of the safety retaining pin so as to positively prevent withdrawal of the hitch pin from its hitched position in said hitch pin holes and to prevent inadvertent uncoupling of the implement and the towing vehicle.

2. A safety hitch pin as set forth in claim 1 wherein said locking means comprises a lock ring pivotally secured to one end of said retaining pin, said ring extending from said one end beyond the other end of the retaining pin, with the retaining pin inserted in said transverse hole in said stud said ring being swingable from said locked position in which the ring is adjacent said other end of the retaining pin to an unlocked position in which the ring is clear of the stud, thereby to permit the retaining pin to be removed from and inserted in the transverse hole in the stud.

3. A safety hitch pin as set forth in claim 2 wherein said retaining pin has a head at said one end, said ring being split and having ends adjacent one another, said head having blind holes therein for reception of the ends of the ring on opposite sides of said head, said blind holes being offset relative to one another whereby with the ends of the ring installed therein pivotal movement of said ring from its locked to its unlocked position is restrained, thereby to prevent inadvertent movement of the ring during towing of the implement.

4. A safety hitch pin as set forth in claim 1 wherein said stud is secured to the top face of said tongue and is spaced toward said implement from said hitch pin holes, said transverse hole being spaced above said top surface of the tongue a distance greater than the thickness of said bar whereby said bar may be held captive between said retaining pin and said tongue.

* * * * *